(12) United States Patent
Lee

(10) Patent No.: US 6,494,052 B1
(45) Date of Patent: Dec. 17, 2002

(54) SELF CONTAINED ELECTRICAL HEAT PUMP HVAC UNIT

(75) Inventor: Mike S. S. Lee, York, PA (US)

(73) Assignee: Trans/Air Manufacturing Corp., Dallastown, PA (US)

( * ) Notice: Subject to any disclaimer, the term of this patent is extended or adjusted under 35 U.S.C. 154(b) by 0 days.

(21) Appl. No.: 09/633,291

(22) Filed: Aug. 4, 2000

(51) Int. Cl.$^7$ ................................................ B60H 1/32
(52) U.S. Cl. ........................................ 62/244; 62/324.1
(58) Field of Search ................................ 62/244, 324.1, 62/239, 298, 259.1, 160, 238.7; 165/42, 43

(56) References Cited

U.S. PATENT DOCUMENTS

| | | | |
|---|---|---|---|
| 3,871,188 A | * 3/1975 | Vold et al. ...................... | 62/298 |
| 4,201,064 A | 5/1980 | Krug et al. ..................... | 62/239 |
| 4,622,831 A | 11/1986 | Grupa .......................... | 62/244 |
| 4,727,728 A | 3/1988 | Brown ......................... | 62/244 |
| 4,736,597 A | * 4/1988 | Anderson et al. .............. | 62/239 |
| 4,748,825 A | 6/1988 | King ............................. | 62/244 |
| 4,787,210 A | 11/1988 | Brown ......................... | 62/89 |
| 4,870,833 A | 10/1989 | Matsuda et al. ............... | 62/134 |
| 4,926,655 A | 5/1990 | King ............................ | 62/244 |
| 5,001,905 A | 3/1991 | Miyazaki ...................... | 62/244 |
| 5,123,258 A | * 6/1992 | Brown et al. .................. | 62/244 |
| 5,184,474 A | 2/1993 | Ferdows ....................... | 62/244 |
| 5,220,808 A | 6/1993 | Mayer .......................... | 62/244 |
| 5,428,967 A | 7/1995 | Goto et al. .................... | 62/230 |
| 5,605,055 A | 2/1997 | Salgado ........................ | 62/244 |
| 5,609,037 A | 3/1997 | Fischler ........................ | 62/239 |
| 5,678,761 A | 10/1997 | Ikeda .......................... | 237/2 B |
| 5,749,235 A | * 5/1998 | Ueda .......................... | 62/244 X |

OTHER PUBLICATIONS

Carrier Transicold brochure, Rearmount Systems, R–134a.
Thermo King brochure, T Series from Thermo King.

* cited by examiner

*Primary Examiner*—Chen-Wen Jiang
(74) *Attorney, Agent, or Firm*—Jacobson Holman, PLLC

(57) ABSTRACT

A self-contained electrical heat pump heating, ventilating and air conditioning unit (HVAC) adapted for mounting at the rear of a bus or other similarly large transport vehicle. The HVAC unit is unitary in construction, compactly arranged and provided with an integrated heat pump. The HVAC unit is specially constructed for use with electric buses or electric/hybrid buses, but can also be adapted for use on buses powered by internal combustion engines.

17 Claims, 4 Drawing Sheets

SELF CONTAINED ELECTRICAL HEAT PUMP HVAC UNIT

BACKGROUND OF THE INVENTION

1. Field of the Invention

The present invention generally relates to a heating, ventilating and air conditioning unit (HVAC) adapted for mounting at the rear of a bus or similar type vehicle for transporting a large number of occupants. More specifically, the HVAC unit is self-contained, compactly arranged, and provided with an integrated heat pump. It is specially constructed for use with electric buses or electric/hybrid buses but can also be used with buses powered by internal combustion engines.

2. Description of the Prior Art

Heating and air conditioning units have been installed in various types of vehicles with the design and operating parameters of the HVAC units adapted for installation in specific types of vehicles. Passenger buses present particular problems due to the relatively large heating and cooling load produced by a plurality of passengers and extensive window areas. Also, it is difficult to obtain effective air circulation through a large volume of internal space to be heated or cooled. In prior art developments, passenger buses have been provided with HVAC units mounted on the roof or at other locations with the compressor assembly being driven from the engine which powers the bus. A condenser, condenser fan, evaporator and evaporator fan are associated with a compressor, expansion valve and other conventional components to provide a refrigeration system to supply conditioned air to the interior of the bus. Separate heating systems are usually provided for use when heated air is required to maintain the interior of the bus at a comfortable temperature level during periods of cold weather.

The following U.S. patents relate to the heating and cooling of a vehicle interior and the occupants therein:

| | | |
|---|---|---|
| 4,201,064 | 4,870,833 | 5,428,967 |
| 4,622,831 | 4,926,655 | 5,605,055 |
| 4,727,728 | 5,001,905 | 5,609,037 |
| 4,748,825 | 5,184,474 | 5,678,761 |
| 4,787,210 | 5,220,808 | |

The above listed patents disclose various roof and rear mounted air conditioning and heating units for buses and other vehicles. However, the above listed patents do not disclose a self-contained HVAC unit including a heat pump to provide a unitary climate control system utilizing a modular concept by which the heating and cooling capacity of the system may be varied depending upon the requirements of each installation without altering the size parameters of the supporting framework including a horizontally disposed support base and an upright support structure rigidly mounted on the base.

SUMMARY OF THE INVENTION

The self-contained electrical heat pump HVAC unit of this invention is mounted at the rear of a bus or other similar type vehicle in an area above the prime mover of the vehicle which is usually vacant and available. The mounting of the HVAC unit in this area of the bus enables installation without alteration of the roof or other external configuration of the bus.

The HVAC unit is preferably modular in design and includes a supporting framework on which is mounted and supported a condenser or condensers including a fan or fans, an evaporator or evaporators, an evaporator blower or blowers, a compressor or compressors, an air plenum assembly or air plenum assemblies and refrigeration and heat pump system components to provide a complete refrigeration and heat pump cycle. The supporting framework includes an upright support structure attached to a support base and panels are provided to enclose, protect the heat exchangers and isolate the condenser or condensers from the evaporator or evaporators to maintain proper air flow. The bus may be provided with a ducted or free blowing air circulation system or a combination of both depending upon the installation requirements for each individual bus. When in a cooling mode, the air circulation system in the bus is associated with the evaporator or evaporators and evaporator blowers. The condensers and condenser fans are associated with air inlet panels at the sides of the bus and an air outlet panel at the rear of the bus. When in a heating mode, the association of the components is switched with the condensers or condenser becoming evaporators and the evaporator or evaporators becoming condensers in a manner well known in the operation of a heat pump.

The rear mounted, multi-functional climate control system with integrated heat pump of this invention is especially designed for electric or electric/hybrid urban buses. However, it is also fully capable of being incorporated into a conventional bus utilizing an internal combustion engine as the prime mover. The construction of this system does not require the formation of holes or other alterations to the roof of the bus to accommodate the condenser and enables the integration of a heat pump system into the unit and eliminates the possibility of snow or ice clogging the condenser. The modular concept of the system simplifies the design and eases installation of the system by virtue of enabling different system capacities to be installed in the same available space by varying the number of compressors, condensers, evaporators and associated fans in the available space thereby minimizing energy consumption by adapting the capabilities of the HVAC unit with the requirements of the installation.

It is therefore an object of the present invention to provide a self-contained HVAC unit with integrated electric heat pump mounted at the rear of a bus or other similar vehicle with the components being mounted on a supporting framework capable of fitting into the normally available space above the bus internal combustion engine or power unit in an electric or electric/hybrid bus. The supporting framework or structure is capable of supporting different capacity HVAC components in the same available space thereby enabling the capacity of the HVAC unit to satisfy the heating and cooling requirement of each particular installation without altering the overall size of the unit.

Another object of this invention is to provide a self-contained unitary HVAC unit in which the supporting framework includes a supporting base and a centrally located upright support structure with a condenser or condensers mounted on the support base against one side of the upright support structure and an evaporator or evaporators mounted on the other side of the support structure with the evaporator assembly located forwardly of the condenser assembly. The evaporator assembly includes a blower or blowers and the condenser assembly includes a fan or fans for air circulation through the evaporator and condenser assemblies by circulating air through and over the coil and fin evaporator and condenser assemblies. The supporting framework also supports one or more electrically driven compressors and the other conventional components of a HVAC unit, such as an expansion valve, accumulator, dryer, fans, refrigerant circulating tubing and other components to form a closed refrigeration/heat pump system.

A further object of the invention is to provide a self contained modular HVAC unit in which the support structure includes panels to isolate the condenser and evaporator assemblies, an air plenum or plenums associated with the evaporator or evaporators for circulation of conditioned air into the passenger area of the bus by utilizing a blower or blowers and a ducted air circulation system, a free blowing air circulation system or a combination of both systems.

Yet another object of this invention is to provide a HVAC in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
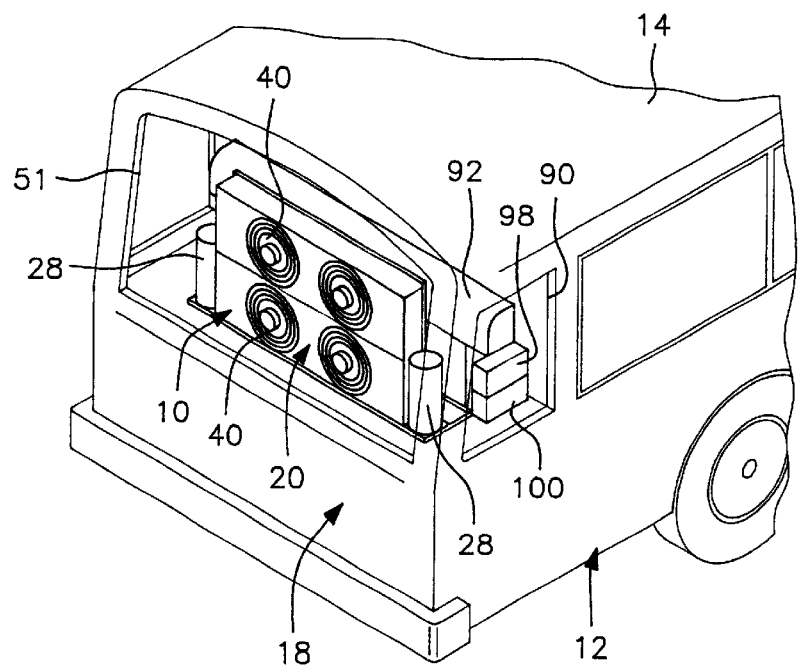
FIG. 1 is a schematic perspective view of a self-contained unitary HVAC unit employing a free blowing air circulation system in accordance with the present invention installed at the rear of a bus in a space below the roof.
Figure 2:
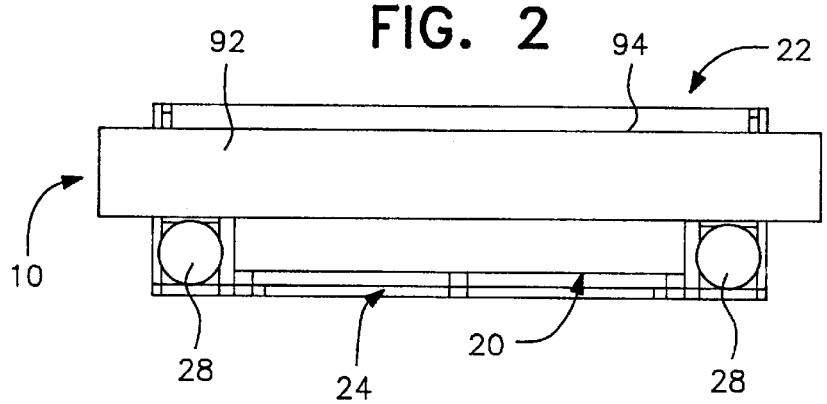
FIG. 2 is a schematic top plan view illustrating the orientation of the components of the HVAC unit in FIG. 1.
Figure 3:
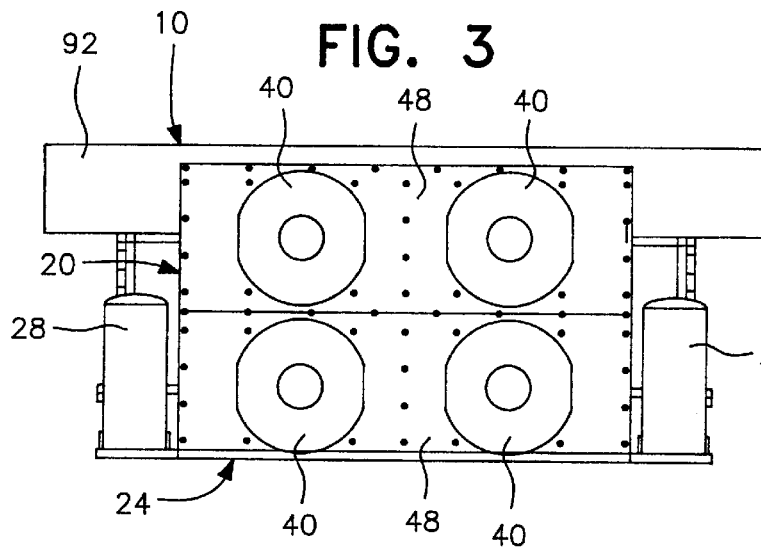
FIG. 3 is a rear elevational view of the HVAC unit of FIG. 1.

Although only two preferred embodiments of the invention are explained in detail, it is to be understood that the invention is not limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity. It is to be understood that each specific term includes all technical equivalents which operate in a similar manner to accomplish a similar purpose.

The HVAC units of the present invention as illustrated in FIGS. 1–4 and FIGS. 5–7 are basically the same and utilize a compression/expansion refrigeration system. As illustrated in FIGS. 1–4, the HVAC unit 10 which is a free blowing unit is mounted in the rear of a bus 12 below the roof 14 and in a space 16 located above a compartment area 18 occupied by the electrical components of an electric vehicle or electric/hybrid bus or an internal combustion engine if fuel powered. The rearward side of the HVAC unit 10 includes a condenser assembly generally designated by the numeral 20 and the forward side of the HVAC unit 10 includes an evaporator assembly generally designated by the numeral 22. These assemblies are mounted on a supporting framework generally designated by the numeral 23, see FIG. 7, to form a self-contained HVAC unit. The framework 23 includes a horizontally disposed supporting base generally designed by the numeral 24 and an upright support structure generally designed by the numeral 26 rigid with the base 24. Also supported on the base 24 is a compressor assembly 28, preferably a hermetically sealed compressor. The HVAC unit shown in the drawings, may also include an optional second compressor assembly 28 at the opposite side of the base 24.

Figure 5:
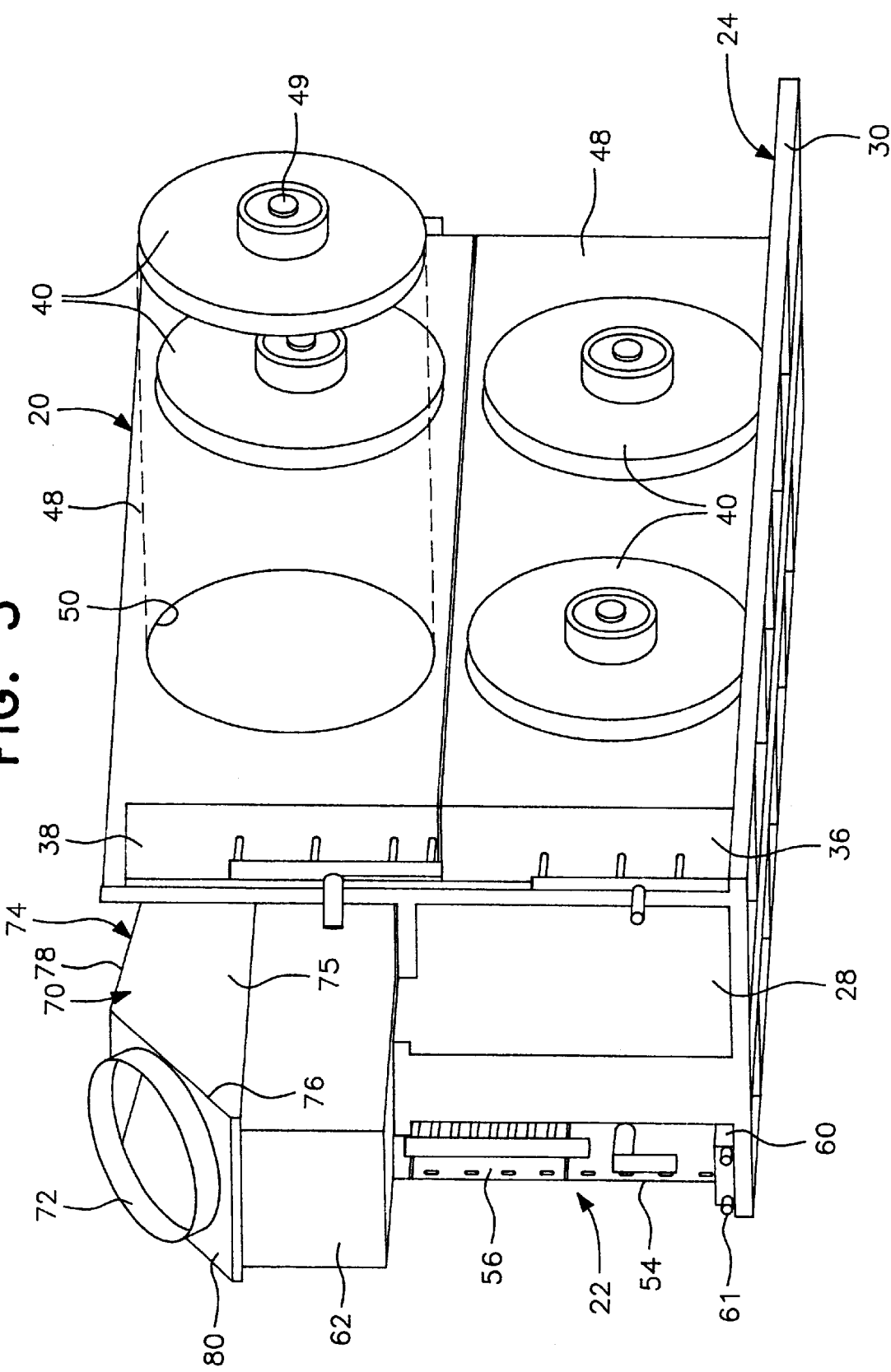
FIG. 5 is a schematic perspective view of a HVAC unit employing a ducted air circulation system from the rear with one condenser fan shown removed.
Figure 6:
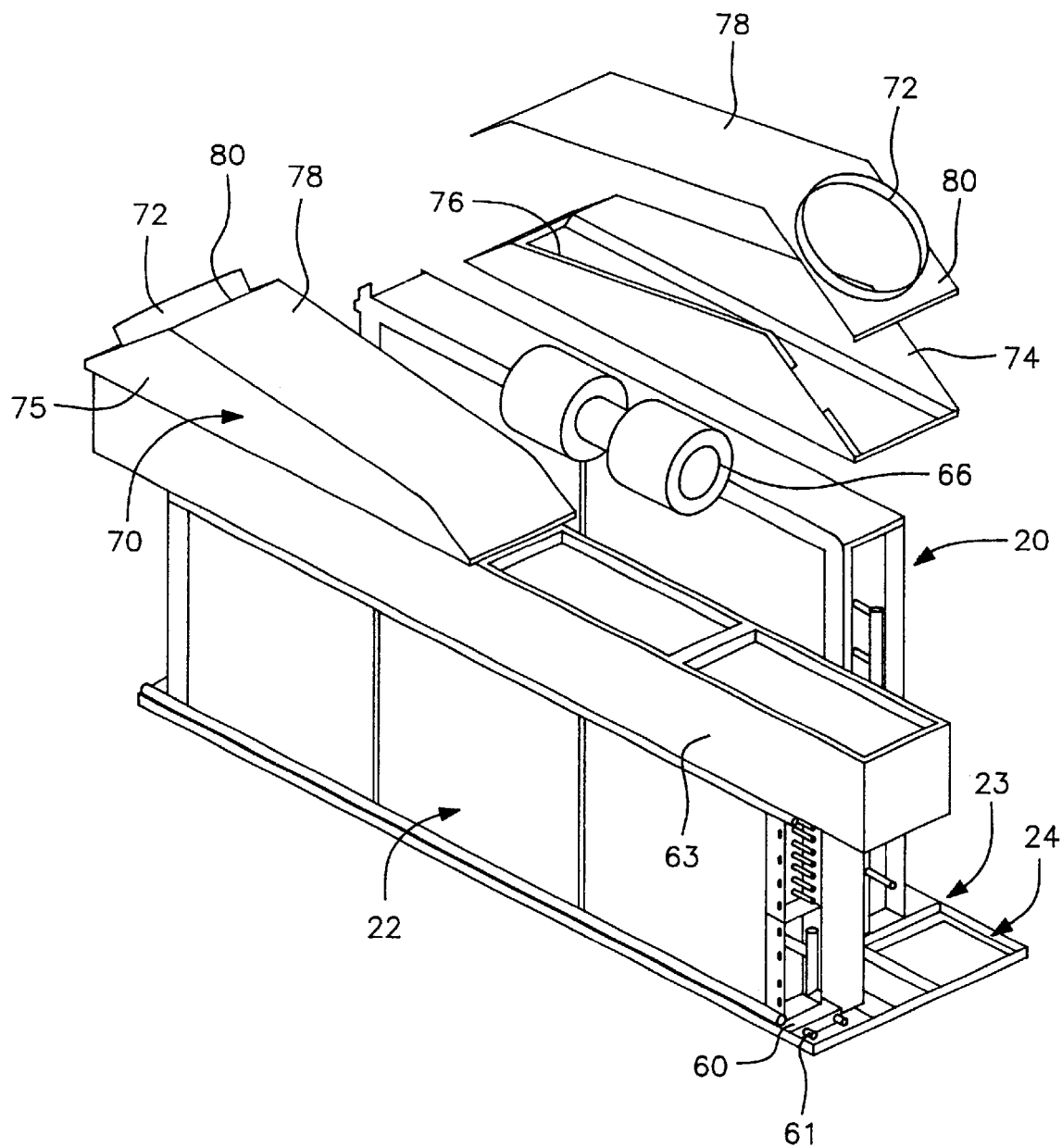
FIG. 6 is a group perspective view of the HVAC unit in accordance with this invention with the components from the front with components of the evaporator assembly in exploded relation.
Figure 7:
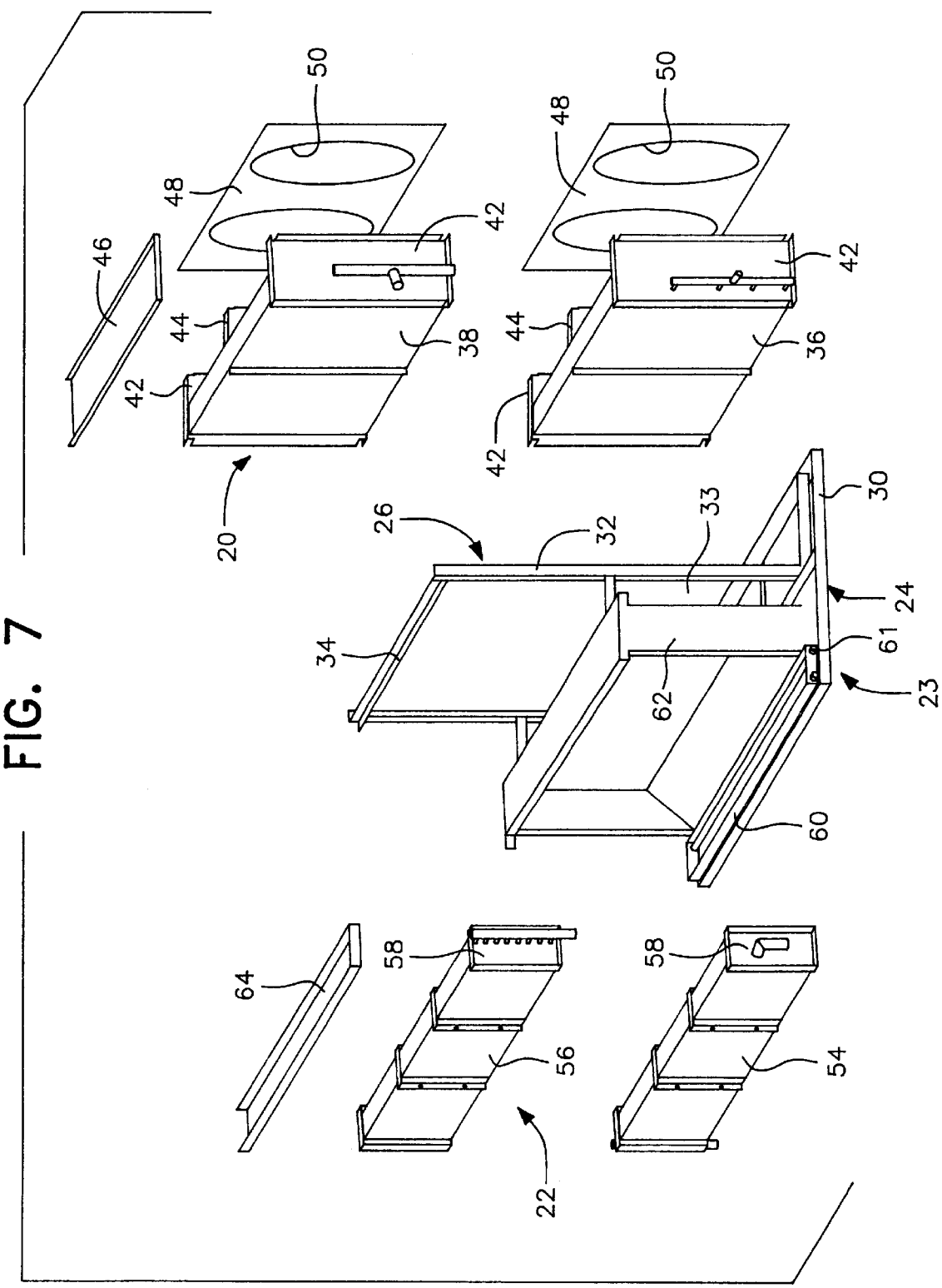
FIG. 7 is an exploded perspective view of the supporting framework components and components of the condenser assembly and evaporator assembly of the HVAC unit in accordance with this invention illustrating the supporting framework with supporting base and upright supporting structure.

As illustrated in FIGS. 5–7 which show a ducted air flow embodiment, the base 24 includes a rectangular supporting frame 30 in the form of a plurality of rigidly interconnected longitudinal and transverse structural members oriented in spaced relation. The upright support structure 26 includes upwardly extending rigid side members 32 connected with the base 24 with the upper ends of the members 32 being rigidly interconnected by a top member 34.

The condenser assembly 20 includes a lower condenser 36 and an upper condenser 38 each of which is provided with a pair of air circulating axial flow fans 40 for circulating air through the condenser assembly from the periphery thereof and out the rear of the condenser assembly and out through a grill (not shown) in the rear opening of the space 16. Each of the upper and lower condensers 36 and 38 is a conventional coiled tube and fin heat exchanger and includes side walls 42 and a central wall 44 which are rigidly affixed to the supporting base 24 and abutted against upright frame member 32. As illustrated in FIG. 7, there is an air space 33, about 4 inches wide which permits air flow into the condensers 36 and 38. A top panel 46 is connected with the walls 42 and central wall 44 to form a closure for the upper end of the condenser assembly 20 and protect the coil fins. Also, a rear wall 48 is provided for each of the upper and lower condensers 36 and 38 with the rear wall including large openings 50 of a size substantially equal to the diameter of the axial flow fans 40. The fans 40 each have a circular grill type cover to prevent injury to personnel who may come into contact with-the HVAC unit. The fans 40 are driven in a conventional manner by a centrally supported electric motor 49 with the rear wall 48 supporting the fans in the openings 50 for circulating air through the condensers 36 and 38 in a well known manner.

The evaporator assembly 22 includes a lower evaporator 54 and an upper evaporator 56 each of which is a conventional rectangular coiled tube and fin heat exchanger and each of which includes end walls 58. The evaporators 54 and 56 are supported from the supporting base 24 and side members 32 above a drain pan 60 and in front of a blower housing 62. The upper evaporator 56 includes a top panel 64 to protect the coil fins and is attached to housing 62 supported by support structure 26. A pair or more of evaporator blowers 66 are located in an air manifold 63 to move air through the evaporators 54 and 56 into an air plenum 70 mounted above each end of manifold 63. Each air plenum 70 includes an air duct connection 72 which may be cylindrical in configuration for connection with a ducted air circulating system for the bus. The air plenum 70 includes a generally horizontal frame work including side panels 74 which have angulated upper edges 76 for supportingly engaging and connection with top panels 78 and 80. Top panel 80 is angulated and provided with the outwardly inclined air duct connector 72.

Depending upon the capacity requirements for each installation, a single condenser, a single evaporator and a single compressor may be employed or dual condensers, evaporators and compressors may be utilized on the same supporting framework and occupying the same available space. For example, if the bus length ranges between 22 and 36 feet, a single condenser, evaporator and compressor are preferably used. When the bus length is over 36 feet up to approximately 50 feet, dual condensers, evaporators and compressors are preferably utilized.

As illustrated in FIG. 1, the bus 12 is preferably provided with side openings 90 with grill covers (not shown) to permit inlet of ambient air to the space forwardly of the condensers 36 and 38. This inlet of ambient air enables the fans 40 to circulate air through the condensers and out through a grilled opening 51 in the rear of the bus.

Figure 4:
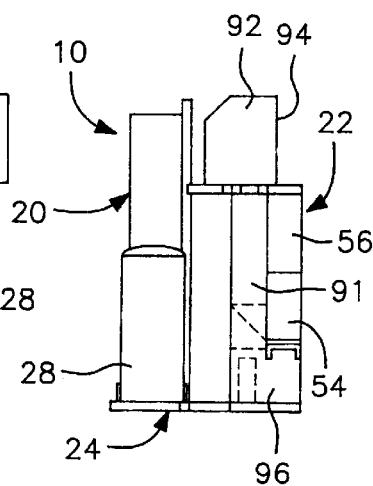
FIG. 4 is a side elevational view of the HVAC unit of FIG. 1.

FIGS. 1–4 illustrate a free blowing embodiment of the invention including a housing 91 and air manifold 92 in which blowers are mounted. The air manifold 92 includes a forwardly facing open area or areas 94 to provide a free blow type air circulation. The structure of the condensers, fans, evaporators, and supporting framework in FIGS. 1–4 is the same as that illustrated in FIGS. 5–7. The schematic illustration in FIGS. 5–7 illustrate the length of the condenser assembly 22 to provide space for one or two compressors 28 depending upon whether dual condensers and evaporators are used. Below the drain pan, a compartment 96 may be provided in the form of the invention in FIGS. 1–4 for all control electronics as shown in FIG. 4. The evaporators 54 and 56 and condensers 36 and 38 are conventional tube and fin heat exchangers and they may be provided with the capability of adding a supplemental heater for use in extreme cold conditions. The drain pan is preferably provided with a pair of drain tubes 61 on each end thereof to drain excess water that may have condensed on the evaporators. When condensers 36 and 38 function as evaporators when the systems is operating in a heat pump mode, no drip pan is required as the vehicle will have a discharge for any condensate.

The overall dimensions of the HVAC unit may vary but in order to fit the space normally available at the rear of the bus, the HVAC unit preferably has an overall height of approximately 37–38 inches, an overall side-to-side dimension of approximately 68–69 inches, and an overall front-to-rear dimension of approximately 21–22 inches. By using a standard supporting framework with a standard supporting base and supporting upright structure, a single evaporator, condenser and compressor may be used or dual evaporators, condensers and compressors may be used with it being understood that an appropriate expansion valve or valves may be employed along with a reversing valve for use when switching between air conditioning mode and heat pump mode and other conventional components and controls used in refrigeration and air conditioning systems may be employed.

Installation of the HVAC unit does not require holes being formed in the roof 14 of the bus 12 which reduces the possibility of the condenser unit becoming clogged by snow or ice. The modular structure of the HVAC unit of this invention enables a single system unit or a dual system unit to be installed in the same available space thereby providing simplified design and easier installation. The air distribution system to circulate air from the passenger compartment, through the evaporator assembly when in a cooling mode and back to the interior of the bus may utilize two, three or more small blowers depending on the cooling requirements of the bus and provides flexibility and choice of ducted, free blow or combined air circulating systems.

When in a heating mode the air from the passenger compartment of the bus circulates through the evaporator assembly 22 which now functions as a condenser assembly and ambient air circulates through the condenser assembly 20 which now functions as an evaporator assembly in order to extract heat from ambient air and transfer heat to the air being returned to the passenger compartment. When in a heating mode, the thermal energy contained in the warm air being exhausted from the passenger compartment can be recovered by the evaporator coil (condenser coil when cooling) and recycled through the heat pump system to provide heat as well as conserve electricity. Similarly, the cool air exhausted from the passenger compartment during the cooling mode can be utilized to reduce the heat load on the condenser and in turn to save energy and improve performance. To recover waste energy, the HVAC unit may have built-in provisions for accommodating one or two additional heat exchangers by attaching one exchanger to the condenser and the other to the evaporator. Electric buses all require cooling for its drive motor(s) and the electronics, therefore most electric bus have two separate liquid-to-air heat exchangers. So when the electric bus is in operation, the heat collected from the cooling system, instead of being dumped into the ambient air can be recovered either for heating the bus interior and/or heating the evaporator coil (condensing coil when cooling) so that the reclaimed energy can recycle back to the heat pump system to heat and also prevent ice from forming on the coil.

The fresh air makeup of the air circulated in the passenger compartment of the bus may be varied from 0 to 100% of outside air to be brought in and the same amount of inside air purged out by utilizing a motorized proportional damper. Fresh air intake and exhaust air outlet can occur at 98 and 100 in FIG. 1. A humidity sensor may also be provided for the interior of the bus to insure that both adequate passenger comfort and energy efficiency can be accomplished.

To utilize this system with a conventional bus, an engine driven electric generator is required together with a voltage regulator and controls to supply power to a climate control system utilizing one or two DC electric motor driven compressors. This enables the HVAC to be easily transformed into either a DC drive system or a conventional engine driven system by changing compressors.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. An HVAC unit for mounting in the rear of a bus comprising a supporting framework, a condenser assembly mounted on said supporting framework, an evaporator assembly mounted on said supporting framework, a compressor assembly mounted on said supporting framework and associated with said condenser assembly and evaporator assembly to provide a compression/expansion refrigeration system, said condenser assembly and evaporator assembly being isolated from each other, an ambient air circulation device associated with said condenser assembly, and a conditioned air circulation device associated with said evaporator assembly when in a cooling mode, said condenser assembly functioning as an evaporator and said evaporator assembly functioning as a condenser when in a heating mode, said supporting framework adapted to occupy a finite space in the bus, said supporting framework enabling the selective use of a condenser assembly having a single condenser and a condenser assembly having a dual condenser and an evaporator assembly having a single evaporator and an evaporator assembly having a dual evaporator and a compressor assembly having a single compressor and compressor assembly having a dual compressor thereby enabling capacity characteristics of the HVAC unit to be varied with the HVAC unit occupying the same volume of space when including single and dual condensers, evaporators and compressors.

2. The HVAC unit as defined in claim 1, wherein said supporting framework includes a generally rectangular base and a generally centrally disposed upwardly extending frame, said condenser assembly being supported on said base on one side of said frame, said evaporator assembly being supported on said base on the opposite side of said frame, said compressor assembly being supported from said base at the ends of said condenser assembly.

3. The HVAC unit as defined in claim 2, wherein said condenser assembly includes at least one condenser, said ambient air circulating device including at least one fan associated with said condenser.

4. The HVAC unit as defined in claim 3, wherein said evaporator assembly includes at least one evaporator, said conditioned air circulating device associated with the evaporator including at least one blower circulating air from an interior compartment of the vehicle through the evaporator and back to the interior compartment of the bus.

5. The HVAC unit as defined in claim 4, wherein said compressor assembly includes at least one compressor mounted at one end of the condenser.

6. The bus as defined in claim 4, wherein said conditioned air circulation device includes a free air blowing system.

7. The bus as defined in claim 4, wherein said conditioned air circulation device includes a ducted air system.

8. The HVAC unit as defined in claim 1, wherein said base and frame define parameter dimensions of said HVAC unit with the parameter dimensions remaining the same when utilizing a single evaporator, condenser and compressor assembly as when using a dual evaporator, condenser and compressor assembly.

9. The HVAC unit as defined in claim 1, wherein said HVAC unit is mounted at the rear of a passenger bus above an engine compartment of the bus and below a roof of the bus without requiring any modification of, the, roof of the bus to reduce clogging of the condenser assembly by snow and ice.

10. The bus as defined in claim 1, wherein said HVAC unit is mounted transversely at the rear of the bus and adjacent but below a roof on said bus.

11. The HVAC unit as defined in claim 1, wherein said supporting framework includes a base and an upwardly extending frame, said condenser assembly being supported on said base on one side of said frame, said evaporator assembly being supported on said base on the opposite side of said frame, said compressor assembly being supported on said base at an end of said condenser assembly.

12. The HVAC unit as defined in claim 11, wherein said condenser assembly includes at least one condenser, said ambient air circulating device including at least one fan associated with said condenser.

13. The HVAC unit as defined in claim 11, wherein said evaporator assembly includes at least one evaporator, said conditioned air circulating device associated with the evaporator including at least one blower circulating air from an interior compartment of the vehicle through the evaporator and back to the interior compartment of the bus.

14. The HVAC unit as defined in claim 11, wherein said compressor assembly includes at least one compressor mounted at one end of the condenser.

15. An air conditioned bus comprising a passenger compartment, a heat pump HVAC unit mounted in the rear of said bus and in communication with said passenger compartment, said HVAC unit including an ambient air circulation system communicating with ambient air, a conditioned air circulation system communicating with said passenger compartment, said HVAC unit including a compression and expansion refrigeration system including an evaporator assembly, a compressor assembly and a condenser assembly, a support frame mounted transversely in the rear of said bus to support said evaporator assembly, compressor assembly and condenser assembly, said frame including a base and an upstanding support structure, said condenser assembly being supported from said base on one side of said upstanding support structure, said evaporator assembly being supported from said base at an opposite side of said upstanding support structure, said compressor assembly being supported from an end of said base in alignment with one of said evaporator assembly and said condenser assembly, said evaporator assembly being associated with said conditioned air circulation system, said condenser assembly being associated with said ambient air circulation system, said evaporator assembly functioning as an evaporator and said condenser assembly functioning as a condenser when said HVAC unit is in a cooling mode, said evaporator assembly functioning as a condenser and said condenser assembly functioning as an evaporator when said HVAC is in a heating mode to enable variation in the capacity of said evaporator assembly, condenser assembly and compressor assembly while occupying substantially the same space.

16. An air conditioned bus comprising a passenger compartment, a heat pump HVAC unit mounted in the rear of said bus and in communication with said passenger compartment, said heat pump HVAC unit including an ambient air circulation system communicating with ambient air, a conditioned air circulation system communicating with said passenger compartment, said heat pump HVAC unit including a compression and expansion refrigeration system including an evaporator assembly, a compressor assembly and a condenser assembly, a support structure mounted in the rear of said bus to support said evaporator assembly, compressor assembly and condenser assembly, said evaporator assembly being selectively communicated with said conditioned air circulation system and said ambient air circulation system, said condenser assembly being selectively communicated with said ambient air circulation system and said conditioned air circulation system, said evaporator assembly functioning as an evaporator and said condenser assembly functioning as a condenser when said heat pump HVAC unit is in a cooling mode, said evaporator assembly functioning as a condenser and said condenser assembly functioning as an evaporator when said heat pump HVAC is in a heating mode, said heat pump HVAC unit being mounted transversely in the rear of the bus and adjacent but below a roof on said bus.

17. An air conditioned bus comprising a passenger compartment, a heat pump HVAC unit mounted in the rear of said bus and in communication with said passenger compartment, said heat pump HVAC unit including an ambient air circulation system communicating with ambient air, a conditioned air circulation system communicating with said passenger compartment, said heat pump HVAC unit including a compression and expansion refrigeration system including an evaporator assembly, a compressor assembly and a condenser assembly, a support structure mounted in the rear of said bus to support said evaporator assembly, compressor assembly and condenser assembly, said evaporator assembly being selectively communicated with said conditioned air circulation system and said ambient air circulation system, said condenser assembly being selectively communicated with said ambient air circulation system and said conditioned air circulation system, said evaporator assembly functioning as an evaporator and said condenser assembly functioning as a condenser when said heat pump HVAC unit is in a cooling mode, said evaporator assembly functioning as a condenser and said condenser assembly functioning as an evaporator when said heat pump HVAC is in a heating mode, said support structure including a base supporting an evaporator assembly having a single evaporator or a dual evaporator occupying a finite space on the support structure, said support structure base also supporting a condenser assembly having a single condenser or a dual condenser occupying a finite space on the support structure to enable variation in the capacity of the heat pump HVAC unit without variation in the finite space occupied by the HVAC unit.

* * * * *